Figure 1:
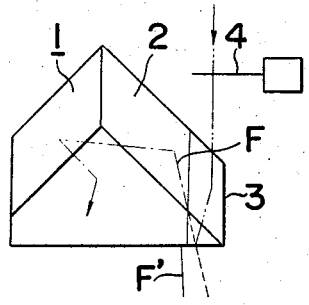

United States Patent [19]
Uchida

[11] 3,828,644
[45] Aug. 13, 1974

[54] DETACHABLE VIEWFINDER ARRANGEMENT FOR USE IN A PHOTOGRAPHIC CAMERA

[75] Inventor: Isamu Uchida, Osaka, Japan

[73] Assignee: Minolta Camera Kabushiki Kaisha, Osaka-fu, Japan

[22] Filed: Dec. 13, 1972

[21] Appl. No.: 314,551

[30] Foreign Application Priority Data
Dec. 20, 1971 Japan.............................. 46-121021

[52] U.S. Cl. ........................88/54, 95/11 v, 95/42
[51] Int. Cl. ...................................... G03b 13/02
[58] Field of Search.......... 88/1.5 R; 95/10 R, 11 V, 95/42, 44 R

[56] References Cited
UNITED STATES PATENTS
3,314,345  4/1967  Ebertz et al..................... 88/1.5 R X
3,630,133  12/1971  Shimomura............................ 95/42

Primary Examiner—Ronald L. Wibert
Assistant Examiner—F. L. Evans
Attorney, Agent, or Firm—Wenderoth, Lind & Ponack

[57] ABSTRACT

A detachable viewfinder arrangement for use in a photographic camera of the type designed to accommodate such detachable viewfinder, which essentially comprises a main prism of pentagonal shape having a pair of oppositely sloping surfaces and a small prism composed of a pair of upper and lower portions bonded to each other, the boundary therebetween being formed with a semitransparent mirror surface which extends in the same plane as that of one of the sloping surfaces of the main prism and substantially forms a partial extension of the one of the sloping surfaces of the main prism. This arrangement is effective to project at least one indicating mark disposed above the upper surface of the upper portion of the small prism into the field of view of the finder.

7 Claims, 9 Drawing Figures

DETACHABLE VIEWFINDER ARRANGEMENT FOR USE IN A PHOTOGRAPHIC CAMERA

The present invention relates to a detachable viewfinder arrangement for use in a photographic camera and, more particularly, to a mirror reflex viewfinder of the type by which indicating marks arranged outside the optical path of viewfinder rays can be projected into the field of view of the viewfinder.

These indicating marks may be one or more of the movable pointer needle of an exposure meter, the follow-up needle coupled with the shutter speed adjusting dial, the focal distance adjusting scale, the diaphragm aperture adjusting scale, the exposure time adjusting scale, the underexposure warning mark and a warning mark indicating that the shutter speed is within a relatively low speed range.

To obtain display within a viewfinder, some light source is necessary. Methods of obtaining light include using a sun beam and/or a beam of light from an artificial light source, obtaining light from that which has passed through the optical system of a photographic camera, or obtaining light directly from the outside, The present invention is applicable in any viewfinder arrangement employing the above methods except for the second mentioned one. Conventionally, in these methods, except for the second mentioned one, light is obtained by a suitable method via the top of the prism forming the viewfinder; the present invention is also constructed to obtain light in this manner, but it additionally offers an arrangement for display within a viewfinder, which is structurally compact and suitable for use in cameras using a detachable viewfinder prism portion.

Hereinafter, description of the conventional arrangement will be made with reference to FIGS. 1 and 2 of the accompanying drawings, respectively showing conventional display arrangements obtaining light from an external source by view finder prisms. In FIG. 1, a movable pointer needle 4 of an exposure meter is positioned above and close to a small prism 3 bonded to, and forming a substantial extension of one side 2 of the roof of, a viewfinder prism 1. Light enters the small prism 3, i.e., the extension of the side of the roof 2, from above, is reflected from the bottom of the small prism 3, enters the prism 1, and strikes the side of the roof 2 and, thereafter, is reflected within the prism 1 in the same manner as light from the viewfinder focusing screen (not shown in either FIG. 1 or FIG. 2) and then enters the viewer's eye. In the example of FIG. 1, since the pointer needle 4 as drawn is designed so as to move diagonally with respect to the vertical plane of FIG. 1, the optical distance between the needle 4 and the viewfinder eyepiece (not shown, but would be in front of the prism 1 in the drawings) changes in accordance with the movement of said needle 4 and, therefore, the image of the needle 4 does not appear as sharply as the viewfinder image. In addition, the needle image may be subject to chromatic aberration since the light carrying the image of the needle 4 enters via the sloping, upper surface of the small prism 3. Another disadvantage is that light carrying the needle image must be reflected on to the roof of the prism 1 from the bottom of the small prism 3, and the inclination of light F thus reflected from the bottom of the small prism 3 is greater than that of light F' which enters the bottom of the prism 1 from the focusing screen, i.e., light representing objects within the viewfinder field, and the view within the viewfinder and the image of the needle 4 appear in a relatively remotely separated relation to each other as shown by G and H respectively in FIG. 3. Consequently, the use of this kind of viewfinder tires the eyes of the viewer or photographer.

Figure 2:
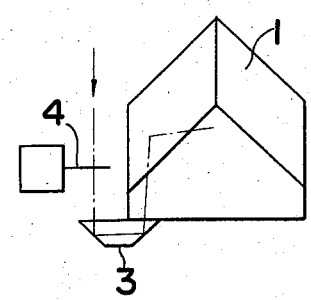
Figure 3:
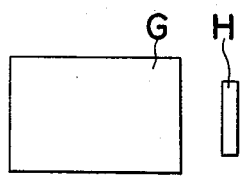

The arrangement shown in FIG. 2 is an improved version which overcomes the defects described above. In this example of FIG. 2, a beam of light carrying an image of the needle 4 enters a small prism 3, which is bonded to the edge of the bottom of a prism 1, from above. In this arrangement, since the optical distance to the viewfinder eyepiece is unchanged even when the needle moves vertically with respect to the plane of the drawing, and since the angle of incidence of light carrying the image of the needle 4 on the bottom surface of the prism 3 is approximately 90°, the viewfinder is not tiring to use, since G and H of FIG. 3 are brought close to each other, and also there is no chromatic aberration of the needle image. However, this structure also has disadvantages, since the small prism 3 is attached to the bottom of and projecting from the prism 1, which is an essential part of a viewfinder, and so the structure is large and is also unsuited to use for detachable viewfinders since there is a risk of impact between the small prism 3 and the body of the camera when the viewfinder is being removed or attached.

Accordingly, the present invention has as its object the improvement of the arrangement shown in FIG. 2.

Figure 4:
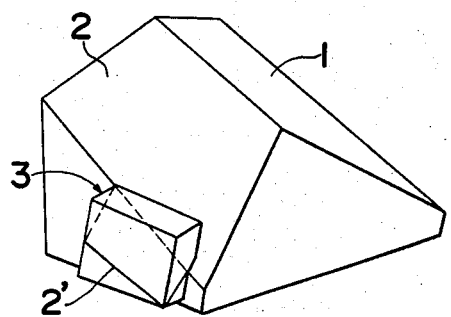
Figure 5:
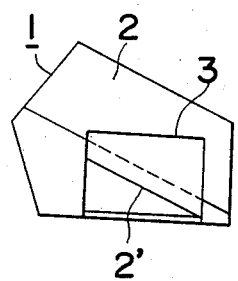
Figure 7:
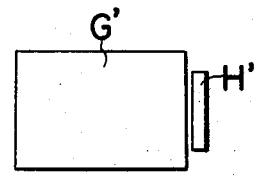
Figure 6:
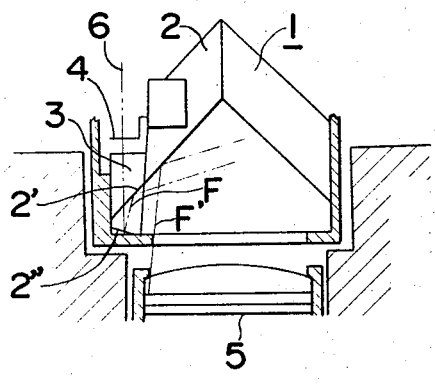
Figure 8:
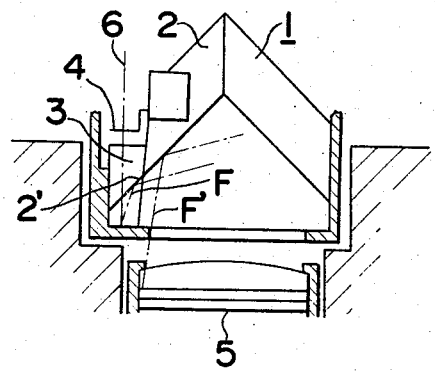
Figure 9:
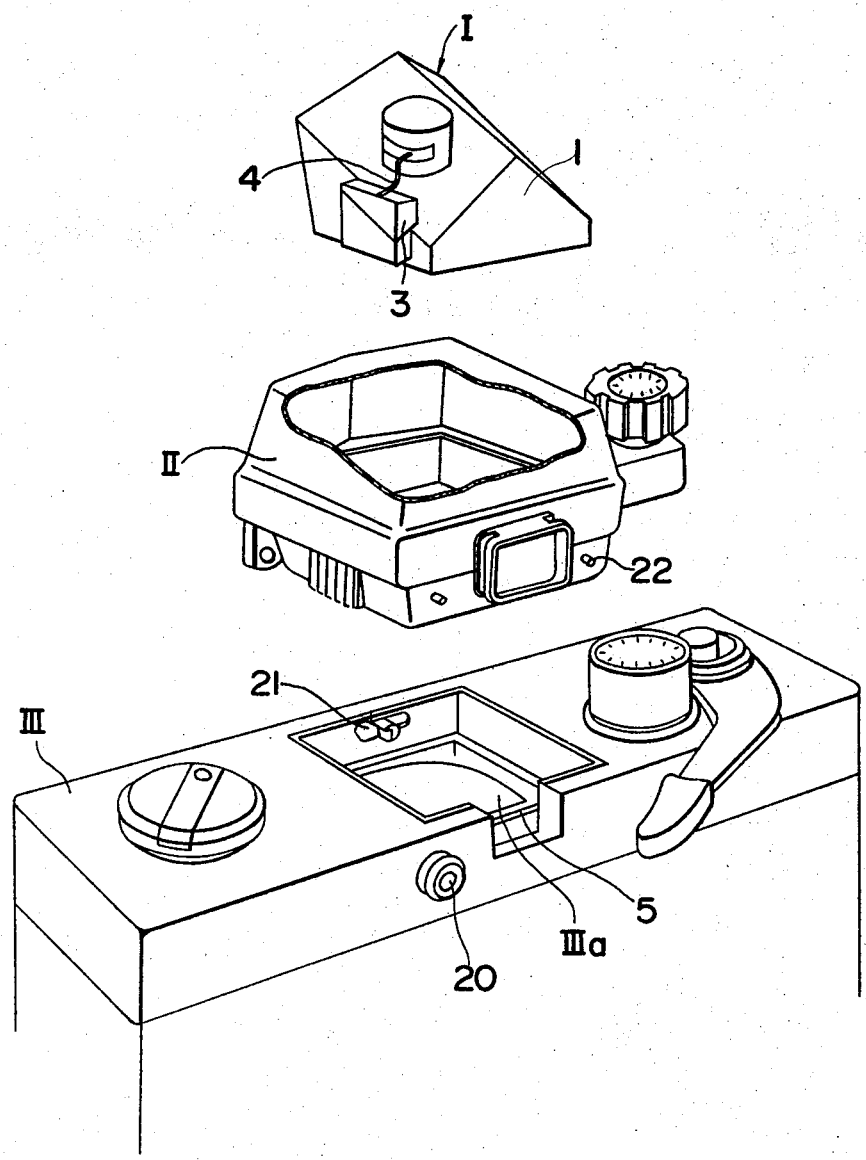

The present invention will be hereinafter described in conjunction with preferred embodiments thereof with reference to the accompanying drawings, in which;

FIG. 1 and FIG. 2 are schematic diagrams showing the conventional viewfinder arrangements, to which reference has been made in the foregoing description, FIG. 3 is a schematic diagram showing the field of view according to the arrangement of FIG. 1, FIG. 4 is a perspective view of a viewfinder roof-edged prism having an auxiliary or small reflective element attached thereto, which is employed in the present invention, FIG. 5 is a side view of FIG. 4, FIG. 6 is a schematic rear elevation of the viewfinder arrangement with the prism mounted on the body of a photographic camera according to one preferred embodiment of the present invention, FIG. 7 is a schematic diagram showing the field of view obtainable by the arrangement of FIG. 6, FIG. 8 is a similar view to FIG. 6, but showing another preferred embodiment of the present invention, and FIG. 9 is a schematic perspective view of a portion of the photographic camera showing a manner to mount the viewfinder arrangement on the camera.

Referring to FIGS. 4 to 6, the viewfinder (representing objects according to one embodiment of the present invention comprises a viewfinder prism 1 to which is bonded a small prism 3, which is approximately a rectangular parallelopiped and is divided into two bonded portions, an upper and a lower, by a surface 2' which is made a semitransparent mirror and which forms a continuation of a side 2 of the roof of the prism 1. The surface joining the small prism 3 and the prism 1 is at a slight inclination and approximately parallel to light rays F' (representing objects within the viewfinder field) which enter the bottom of the prism 1 via a focusing screen 5. The bottom of the prism 2 is silvered to form a mirror, and in the line from front to rear is parallel to the bottom of the prism 1, to which, however, it is at a slight angle seen from the front, as indicated by 2″ in FIG. 6.

A movable pointer needle 4 of an exposure meter is positioned above the prism 3 and moves parallel to the upper surface of said prism 3. Light rays 6 illuminating the needle 4 enter the upper surface of the prism 3, pass through the semitransparent mirror surface 2′, are reflected upwards from the bottom of the prism 3, and strike and are reflected from the transparent mirror surface 2′, the extension of the side of the roof 2, after which they are reflected within the prism 1 in the same manner as light coming from the viewfinder focusing screen 5 and then enter the viewer's eye. The needle 4 being directly above the small prism 3, light rays 6 strike the bottom of the small prism 3 almost vertically, and are reflected therefrom (as marked F in the drawing) parallel to rays F; representing objects within the viewfinder field, with the result that objects within the viewfinder field and the needle are seen close to each other in the viewfinder as shown in FIG. 7, and the problem of trying to observe them when they are apart, observing the pointer needle while viewing the viewfinder image can be, therefore, easily performed.

In addition, since the light rays 6 enter the small prism 3 approximately vertically, the needle image is not subject to chromatic aberration, and the distance from the needle to the eyepiece is almost constant, despite of the needle movement, and therefore, the angle at which the needle is seen does not change.

Furthermore, since there is no projecting part as at the bottom of the prism 1 in FIGS. 1 and 2, the whole structure of this viewfinder is more compact, and makes for simple, easy operation with a camera using an interchangeable viewfinder constructed in accordance with the present invention, due to the fact that there are no parts that risk impact with the body of the camera on removal or attachement of the viewfinder.

In the embodiment described above, the small prism 3 is a rectangular parallelopiped which is divided by the semitransparent mirror surface 2′ into an upper and a lower portion, and is bonded to the prism 1. However, alternatives may be contemplated by those skilled in the art. By way of example, it is also possible to extend one side of the prism 1 and paint a semitransparent coating on the portion forming the extension of the side of the roof 2 and then bond the upper half only of the small prism 3 on this extension. The bottom of the small prism 3 may form a level extension to or be at a different level to the bottom of the prism 1.

Furthermore, the inclined portion 2″ shown in FIG. 6 may be, as shown in FIG. 8 showing the other preferred embodiment of the present invention, omitted. In other words, the bottom of the small prism 2 may not be inclined, in which case the distance between the field of view in which the needle image appears and the field of view in which the viewfinder image appears, as indicated by G′ and H′ in FIG. 7, respectively, will become closer to each other than that obtainable by the arrangement of FIG. 3.

Referring now to FIG. 9, the viewfinder arrangement according to any one of the embodiments shown in FIG. 6 and FIG. 8, which is generally indicated by I, is housed within a casing II together with the exposure meter. The body of a photographic camera is shown by III and has a substantially square opening IIIa on the top thereof and above the focusing screen 5 for receiving therein a substantially lower half of the viewfinder casing II. For avoiding an accidental separation of the casing II with the viewfinder arrangement I therein from the body of the camera III once the former has been mounted thereon, a suitable locking device including a lock release button 20 and a plurality of locking members 21 mechanically coupled with said release button 20 is provided on the side of the camera, said locking members 21 being engageable with the corresponding number of engagement projections 22 provided on the side of the viewfinder casing II and separation of said viewfinder casing II from the body of the camera III being possible by operating the release button 21. In any event, this locking device may be of any known construction and well known to those skilled in the art.

As can be clearly understood from FIG. 9, removal and detachment can be easily appreciated due to the fact that, as stated in the foregoing description, the viewfinder arrangement in either of the preferred embodiment of the present invention has no substantially projecting parts which may otherwise obstruct to the removal and detachment of the viewfinder casing II with respect to the body of the camera III.

Although the present invention has been fully described by way of example, it is to be noted that various changes and modifications are apparent to those skilled in the art and, therefore, the present invention is to be understood as including those changes and modifications unless otherwise they depart from the scope of the present invention.

What is claimed is:

1. A detachable viewfinder arrangement for use in a photographic camera having a focusing screen optically associated with the optical system of said camera and a mounting opening on the top of said camera and immediately above said focusing screen, which comprises a main prism having an insight surface through which the line of sight of an observer is directed, reflecting surfaces directing a beam of light carrying the viewfinder image into the eye of the observer along said line of sight; a fixedly positioned auxiliary prism including a first element located adjacent said main prism and having a bottom portion and a second element having the bottom thereof adjacent the uppermost surface of said first element, said uppermost surface of said first element being flush with one surface of a pair of oppositely sloping surfaces which constitute the roof of said main prism; a semitransparent membrane plated on either the bottom of said second element or the uppermost surface of said first element; at least one entrance positioned above the uppermost surface of said second element and through which another beam of light carrying a foreign image enters on to said uppermost surface of said second element, said another beam after having entered said uppermost surface of said second element traveling in such a manner that it passes through said semitransparent membrane and is reflected by said bottom of said first element and then by said semitransparent membrane directing said another beam on to the main prism and then to the insight surface in a straight line to provide the foreign image in the field of view of the observer viewing said viewfinder image.

2. A detachable viewfinder arrangement as claimed in claim 1, wherein said first element is bonded to said main prism and said bottom of said second element is bonded to the uppermost surface of said first element with said semitransparent membrane sandwiched therebetween.

3. A detachable viewfinder arrangement as claimed in claim 1, wherein said bottom of said first element is outwardly upwardly inclined.

4. A detachable viewfinder arrangement as claimed in claim 1, further comprising an exposure meter having a movable pointer needle positioned between said entrance and said uppermost surface of said second element and wherein said foreign image is an image of said pointer needle.

5. A detachable viewfinder arrangement as claimed in claim 1, wherein said first element is an integral part of said main prism.

6. A detachable viewfinder arrangement as claimed in claim 1, further comprising a casing housing therein said main prism, said entrance and said auxiliary prism, said casing being detachably inserted in said mounting opening of said camera with the bottom of said main prism situating immediately above said focusing screen.

7. A detachable viewfinder arrangement as claimed in claim 6, wherein a locking device is provided for avoiding an accidental separation of said casing from said mounting opening of said camera.

* * * * *